United States Patent Office
3,574,541
Patented Apr. 13, 1971

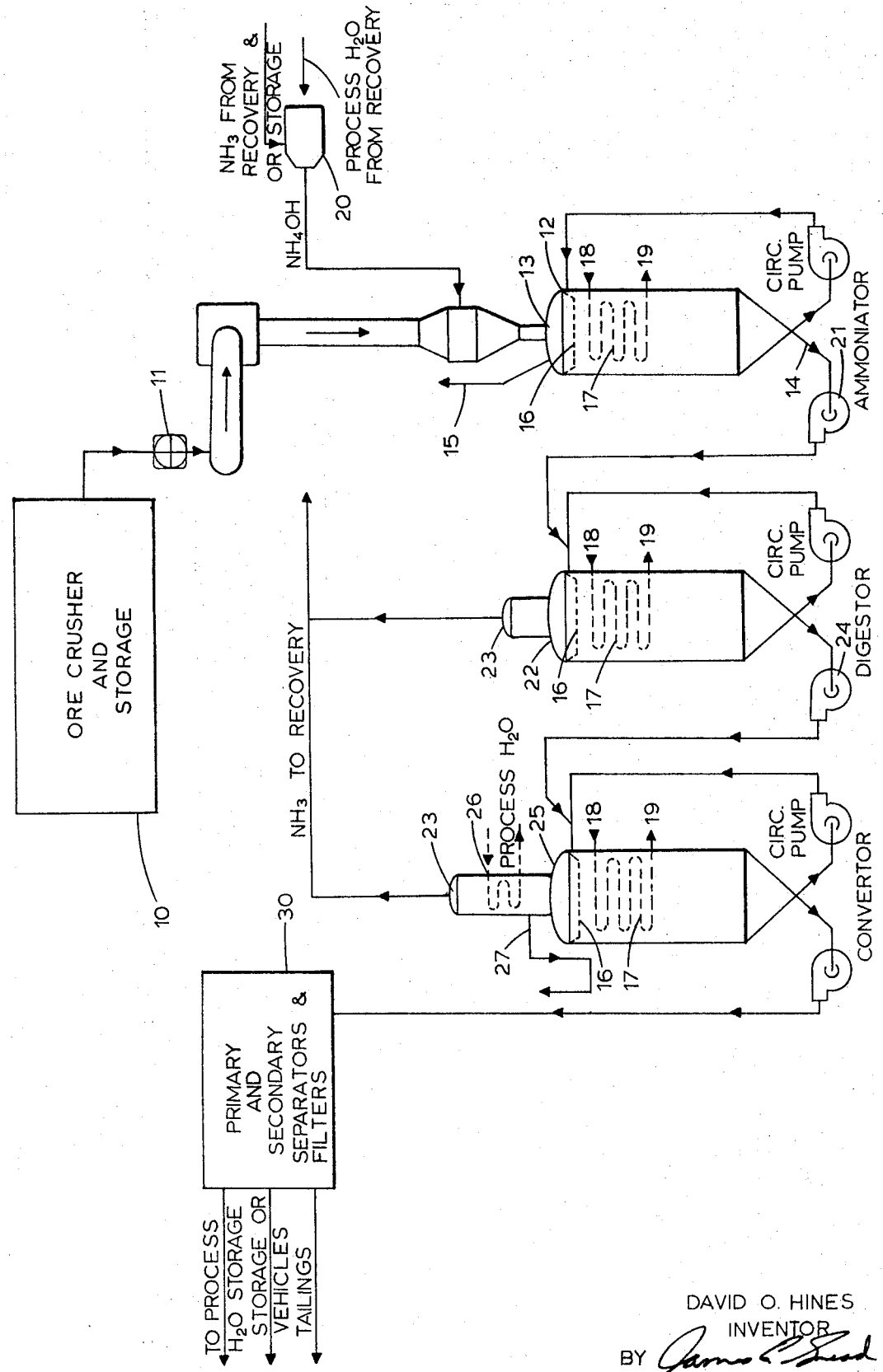

3,574,541
NONFERROUS METAL CONCENTRATION AND
SEPARATION PROCESS
David O. Hines, 275 MacArthur Blvd.,
Oakland, Calif. 94610
Filed Jan. 27, 1969, Ser. No. 794,173
Int. Cl. C01g 3/02; C22b 3/00, 15/08
U.S. Cl. 23—147                        3 Claims

ABSTRACT OF THE DISCLOSURE

This invention is a non-ferrous metal ore beneficiation process wherein non-ferrous metal bearing compounds are converted chemically to new compounds having a greater density than the original ones. The process frees other metals in combination with the non-ferrous metal compounds during the concentration process. The change in density of the non-ferrous metal compounds and separation of the metallic elements in the ore facilitates the separation of the compounds and metallic elements by means of spiral separators or other similar devices. The beneficiation process comprises three stages: the ammoniation stage, the digestion stage and the conversion stage. The steps are carried out at atmospheric pressure, temperatures above 214° Fahrenheit are not required, and elemental copper is not precipitated when the process is used on copper bearing ores.

---

This invention relates to a novel process for concentration of non-ferrous metal bearing compounds and for separating other metals in combination with the non-ferrous metal compounds. While this invention is primarily used for processing copper bearing ores containing a low percentage of copper in compounds such as azurite and malachite, it is not limited to that particular use. Other similar non-ferrous metal bearing ores may be concentrated by means of this process.

Most processes existing in the prior art for precipitation of metallic elements contained within ore require the introduction of carbon monoxide and carbon dioxide in the process stream. Most also require operation in pressures above atmospheric pressures and temperatures above 214° Fahrenheit and they precipitate elemental copper. These requirements have many disadvantages in complicating the process, making equipment expensive and complicated and they tend to clog up the system.

It is therefore an object of this invention to provide a process for concentration of non-ferrous metal bearing compounds and for freeing other metallic elements in combination with the non-ferrous metal compounds.

Another object of this invention is to provide a process for concentrating non-ferrous metal bearing compounds and freeing other valuable metals in combination with the non-ferrous compounds without the need for introducing carbon monoxide or carbon dioxide in the process stream or operating at above atmospheric pressure.

It is a further object of this invention to provide a process for concentrating non-metal bearing compounds and freeing other valuable metallic elements in combination with the non-ferrous metals which do not require operation at temperatures above 214° Fahrenheit and wherein the heat requirements for the process are supplied by steam coils in the various process vessels.

A further object of this invention is to provide a nonferrous metal ore beneficiation process which does not precipitate elemental copper, wherein the necessary carbon monoxide and carbon dioxide gases are produced within the process, and wherein it is not necessary to introduce the gas from outside sources.

Other objects and advantages of this invention will appear as the same is better understood by reference to the specification and accompanying drawings.

In the drawings:

The figure is a schematic flow diagram showing one arrangement of apparatus for performing the process of this invention.

The process which comprises this invention consists of the following three stages:

(A) The ammoniation stage.
(B) The digestion stage.
(C) The conversion stage.

As shown in the figure, the equipment for each stage comprises a vessel having an approximate 20 minute retention capacity and containing horizontally mounted spiral heating coils of adequate capacity to heat the ore slurry to a predetermined temperature. Each vessel has attached thereto a thermally operated steam control valve to maintain the predetermined temperature. A circular perforated distributor plate is provided at the inlet to each vessel to distribute the slurry to the heating coils. A slurry transfer pump transfers the slurry from one stage to the next stage and from the third stage to the separators.

Referring now to the figure, wherein a schematic flow diagram is shown, one containing azurite

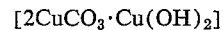

and malachite [CuCO$_3$·Cu(OH)$_2$] is used as an example of the chemical reactions in the process.

Ore crushed to a —20 U.S. standard mesh or smaller is stored in a crushed ore storage bin 10 from which it is released through a rotary feed valve 11 at a predetermined rate, for example, seven tons per minute, into an ammoniator 12. The ammoniator 12 is provided with an input 13 and an output 14 shown schematically in the figure. A vent 15 provides a vent to the atmosphere of excess air, and a circular distributor plate 16 is provided at the inlet to distribute the crushed ore slurry about heating coils 17. Each heating coil has a steam input 18 and an output 19 to a condensate return system.

In the ammoniation stage, the dry ore is mixed with recycled process water containing ammonium hydroxide formed by sparging ammonia from the recycle system and ammonia storage into the processed water using commercially available sparging equipment 20. The ore containing azurite and malachite is mixed with the ammonium hydroxide and water and the mixture is recirculated and heated to approximately 75° F. by the steam coils in the ammoniator. At this temperature, the ammonium hydroxide dissolves the azurite forming cupric hydroxide and ammonium carbonate. The reaction is:

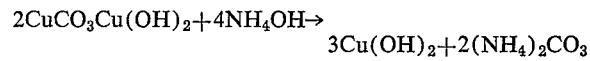

By retaining an excess of ammonium hydroxide in the solution, the cupric hydroxide and ammonium carbonate remain in solution. The slurry containing the malachite and gangue is transferred by a slurry pump 21 to the digestor 22.

Digestor 22 is a vessel similar to the ammoniator 12 having a perforated distributor plate 16, steam heating coils 17 with steam input 18 and condensate output 19. Located at the top of digestor 22 is a gas chamber and vent 23 to allow escape of ammonia from the process and direct it into the ammonia recovery system in a manner well known in the art.

In the digestor stage, the slurry is heated to approximately 150° F. at which temperature a portion of the ammonium carbonate is disassociated to ammonia, carbon dioxide and water. The released ammonia gas leaves the solution, and the carbon dioxide combines with the water forming carbonic acid which dissolves the malachite, forming cupric carbonate and water. The chemical equation for the reaction is:

$$CuCO_3 \cdot Cu(OH)_2 + H_2CO_3 \rightarrow 2CuCO_3 + 2H_2O$$

Part of the excess ammonium hydroxide reacts with the cupric carbonate forming cupric hydroxide and ammonium carbonate. The equation is:

$$2CuCO_3 + 4NH_4OH \rightarrow 2Cu(OH)_2 + 2(NH_4)_2CO_3$$

The cupric hydroxide and ammonium carbonate are held in solution by the excess ammonium hydroxide and the solution and gangue is transferred by slurry pump 24 to the converter stage.

Converter 25 is a vessel such as the ammoniator 12 and the digestor 22 having located therein a perforated distributor plate 16 to distribute the slurry to the heating coils 17. As in the digestor 22, converter 25 is provided with a gas chamber and vent 23 to vent excess ammonia gas to the ammonia recovery system. In addition, a demister having a cooling coil 26 utilizing process water as cooling media is provided at the gas chamber from the converter 25 to cool the $CO_2$ and $NH_3$.

In the converter, the slurry solution is heated to approximately 214° F. at which temperature the ammonium carbonate disassociates to ammonia gas, carbon dioxide gas and water and the cupric hydroxide disassociates to cupric oxide and water. The reaction follows the following equations: $Cu(OH)_2 \rightarrow CuO + H_2O$;

$$(NH_4)_2CO_3 \rightarrow 2NH_3(G) + CO_2(G) + H_2O$$

The ammonia gas and carbon dioxide gas are boiled out of solution, and the ammonia passes through the demister and cooling coils 26 to the ammonia recycle system while the carbon dioxide gas is exhausted to the atmosphere through exhaust vent 27.

The remaining cupric oxide and gangue is pumped into the separators 30 which consist of at least two stages of spiral separators or other similar separators. The cupric oxide and the various other metals and metallic compounds are separated from the gangue.

Since the concentrate has a density approximately two or more times greater than the gangue, the separation is readily accomplished in the separators.

The process described above converts the azurite and malachite with a density of approximately three to cupric oxide with a density of greater than six thereby facilitating separation. From the separation stage, the gangue and concentrate will be pumped to separate filters where the liquid will be separated from the solids and returned to the process in a well known manner. The gangue will be conveyed to the tailings dump and the concentrate to storage, or to vehicles for shipment.

Obviously, many modifications and variations of the present invention are possible in light of the above teachings.

It is, therefore, to be understood that within the scope of the appended claims the invention may be practiced otherwise than as specifically described.

What is claimed is:

1. In a process for concentrating non-ferrous metal compounds within crushed ore containing azurite and malachite and for freeing other metals held in combination with the non-ferrous metals, the steps comprising:

introducing a predetermined volume of the crushed ore into a closed reaction vessel;

distributing the crushed ore evenly about heating coils in the closed reaction vessel;

introducing process water containing ammonium hydroxide in an excess amount sufficient to keep the cupric hydroxide and ammonium carbonate in solution into the closed reaction vessel and mixing it with the crushed ore;

heating the mixture to a temperature of approximately 75° F. at which temperature the ammonium hydroxide dissolves the azurite forming cupric hydroxide and ammonium carbonate in a slurry;

transferring the slurry to a second closed reaction vessel;

distributing the slurry evenly over heating coils in the second closed reaction vessel;

heating the slurry to approximately 150° F. until a portion of the ammonium carbonate is disassociated to carbon dioxide, water and ammonia gas;

removing the ammonia gas from the closed reaction vessel so that the carbon dioxide combines with the water, forming carbonic acid which dissolves the malachite forming cupric carbonate and water, so that the cupric carbonate combines with the excess ammonium hydroxide in the water forming cupric hydroxide and ammonium carbonate;

transferring the slurry to a third closed reaction vessel having steam heating coils therein;

distributing the slurry evenly about the steam heating coils;

heating the slurry to a temperature of approximately 214° F. at which the ammonium carbonate disassociates to ammonia gas, carbon dioxide gas and water and the cupric hydroxide disassociates to cupric oxide and water;

boiling the ammonia gas and carbon dioxide out of solution and removing them from the closed reaction vessel; and transferring the cupric oxide and gangue to separators.

2. The process as defined in claim 1, wherein:
the closed reaction vessels are maintained at atmospheric pressure, and the reaction temperatures do not exceed 214° Fahrenheit.

3. The process as defined in claim 2 wherein:
the process water and released ammonia gas are combined and recycled to the three closed reaction vessels.

References Cited

UNITED STATES PATENTS 1,014,868  1/1912  Gadomsky _____ 75—103
1,608,844  11/1926  Edwards et al. _____ 23—147X

FOREIGN PATENTS 243,075  11/1925  Great Britain _____ 75—103

OSCAR R. VERTIZ, Primary Examiner

G. ALVARO, Assistant Examiner

U.S. Cl. X.R.

75—103, 117